United States Patent Office 3,006,964
Patented Oct. 31, 1961

3,006,964
PROCESS FOR FLUOROALKYL SULFIDES
Robert E. Oesterling, Flourtown, Pa., assignor to Pennsalt Chemicals Corporation, Philadelphia, Pa., a corporation of Pennsylvania
No Drawing. Filed Sept. 24, 1959, Ser. No. 841,949
10 Claims. (Cl. 260—608)

This invention relates to a novel process for preparing fluoroalkyl sulfur compounds. More particularly, this invention deals with an improved process for the preparation of fluoroalkyl sulfur compounds which have the structural formula $$R_fCH_2S_xCH_2R_f$$

where $R_f$ in the above formula is a perfluoroalkyl group, and $x$ is a small integer, preferably from 1 to 3, but may be more than 3 because of the known tendency of sulfur to form polysulfides (see Mohlaus and Seyde, Chem. Ztg. 31 139, 1907 which states that polysulfides with 8 sulfur atoms in the connecting sulfur chain are known).

It is known from the disclosure in U.S. Patent 2,894,991 that mixtures of fluoroalkyl sulfur compounds of the above structure and mercaptans of structure $R_fCH_2SH$ are obtained by reacting a p-toluenesulfonic acid ester of a 1,1-dihydroperfluoroalkanol (i.e., a 1,1-dihydroperfluoroalkyl tosylate) with an inorganic sulfur compound containing divalent sulfur (e.g., alkali metal sulfides, hydrosulfides, and thiosulfates). The reaction disclosed in the above cited patent is carried out in a polar organic solvent such as methanol, ethanol, propanol, isopropanol, dimethylformamide and diethylene glycol. The process gives total yields of mercaptan and sulfide products on the order of about 25% to 50% based on the amount of tosylate used.

It is an object of this invention to provide an improved process for the preparation of bis(1,1-dihydroperfluoroalkyl) sulfides. It is a further object to provide a process for obtaining these sulfides without attendant formation of mercaptans. A still further object is to provide a process giving said sulfides in high yields. Further objects will be apparent in the following description of the invention.

In accord with the objects of this invention, it has been found that the tendency for mercaptan formation can be eliminated and that the yields of the sole sulfide products can be significantly increased (to about 70% to 80%) by reacting a 1,1-dihydroperfluoroalkyl tosylate with an alkali metal sulfide and carrying out the reaction in a solvent consisting essentially of a liquid di-lower alkyl sulfoxide.

The di-lower alkyl sulfoxide that will preferably be used will be dimethyl sulfoxide. Other sulfoxides, however, may be used such as diethyl sulfoxide and methyl ethyl sulfoxide. Even di-n-propyl sulfoxide (M.P. 15° C.) and dibutyl sulfoxide (M.P. 32° C.) may be used providing, of course, they are molten and thus in liquid form. The amount of solvent used will be an amount to enable complete solution of the alkali metal sulfide and the 1,1-dihydroperfluoroalkyl tosylate. The reaction is exothermic and begins readily at temperatures as low as 50° C. and, if desired, the reaction may be carried out at temperatures up to that at which the solvent refluxes. With dimethyl sulfoxide the temperature range will preferably be between about 60° and 100° C., and the reaction is completed within about two hours. It is permissible for the reaction medium to contain up to about 25% by weight of other solvents for the reactants (e.g., water, alcohols, glycols, etc.).

The inorganic divalent sulfur compounds which are used in the reaction include the alkali metal sulfides (including hydrosulfides) such as sodium sulfide, sodium or potassium hydrosulfide and alkali metal polysulfides (e.g., $Na_2S_x$). The preferred polysulfide will be sodium disulfide. The sulfides may be prepared in situ as, for example, by reacting hydrogen sulfide with an alkali hydroxide (e.g., KOH). The use of sodium thiosulfate in the process of this invention does not give high yields of sulfide products.

In order to more clearly describe the process of this invention the following examples are given.

EXAMPLE 1

68.2 g. of sodium hydrosulfide was added to 150 ml. of dimethyl sulfoxide and the mixture warmed to 60° C. A solution of 101 g. of 1,1-dihydrotrifluoroethyl p-toluenesulfonate in 100 ml. of dimethyl sulfoxide was added slowly with stirring at 60°–70° C. over a period of one hour. The mixture was stirred for two hours, then diluted with an equal volume of water and steam distilled. The heavy oil layer from the distillate was separated, dried over anhydrous magnesium sulfate and distilled at atmospheric pressure to give 29 g. (73% yield) of the colorless liquid, bis(1,1-dihydrotrifluoroethyl) sulfide, B.P. 83–84° C., $n_D^{25}$ 1.3352. No mercaptan products could be isolated from the reaction mass.

EXAMPLE 2

Anhydrous sodium sulfide was used in place of the sodium hydrosulfide in Example 1. A 70% conversion to bis(1,1-dihydrotrifluoroethyl) sulfide was obtained.

EXAMPLE 3

72 g. of sodium sulfide crystals ($Na_2S \cdot 9H_2O$) were added to 150 ml. of dimethyl sulfoxide and 30 ml. of water along with 9.6 g. of sulfur. The mixture was digested on the steam bath until solution of the sulfur was complete. To this mixture was added slowly at 70° to 80° C. a solution of 101 g. of 1,1-dihydrotrifluoroethyl p-toluenesulfonate dissolved in 120 ml. of dimethyl sulfoxide. The reaction mixture was stirred for two hours, then diluted with an equal volume of water and steam distilled. The heavy yellow water-insoluble oil layer from the distillate was separated, dried over anhydrous magnesium sulfate and fractionated to give 11.5 g. (29% yield) of bis(1,1-dihydrotrifluoroethyl) sulfide $$(CF_3CH_2-S-CH_2CF_3)$$

and 20 g. (43% yield) of bis(1,1-dihydrotrifluoroethyl) disulfide ($CF_3CH_2-S-S-CH_2CF_3$), B.P. 57° C. (47 mm.), (47 mm.), $n_D^{25}$ 1.3850. Total yield of sulfides obtained was 72% and no mercaptans could be isolated from the reaction mass.

Analysis.—Calculated for $C_4H_4F_6S_2$: C, 20.87; H, 1.74; S, 27.85. Found: C, 21.38; H, 1.98; S, 27.38. The monosulfide $C_4H_4F_6S$ was checked by boiling point and refractive index with an authentic sample and found to conform.

EXAMPLE 4

Example 1 was repeated, but diethyl sulfoxide was used as the solvent. The product bis(1,1-dihydrotrifluoroethyl) sulfide was obtained in essentially the same yield.

EXAMPLE 5

A three-liter round-bottom flask with stirrer, reflux condenser, and addition funnel was assembled and a solution of 459 g. (1.8 mole) of trifluoroethyl p-toluenesulfonate in 600 ml. of dimethyl sulfoxide was added and the solution warmed to 80° C. A solution of 240 g. (1.0 mole) of $Na_2S \cdot 9H_2O$ and 38 g. (1.2 mole) of sulfur in 350 ml. of dimethyl sulfoxide and 100 ml. of water was prepared by digestion on a steam bath until complete solution was effected. This solution of $Na_2S_2$ was added to the tosylate slowly with stirring at 80° to 85° C. over a period of one hour and the mixture was then heated to 85° to 90° C. and held for another hour after complete addition.

The reaction mixture was diluted with an equivalent volume of water and steam distilled. The heavy yellow oil layer was separated from the water layer and dried over anhydrous magnesium sulfate to give 172 g. of crude sulfide product (82% calculated as the disulfide). Distillation gave:

10 g. of $CF_3CH_2SCH_2CF_3$—B.P. 84–87° C.

125 g. of $CF_3CH_2$—S—S—$CH_2CF_3$—
B.P. 60° C. (55 mm.)

30 g. of $CF_3CH_2S_nCH_2CF_3$ residue (n is greater than 2)

It will be apparent to those skilled in the art that instead of using 1,1-dihydrotrifluoroethyl tosylate as a starting material for the preparation of the sulfides defined above, other tosylates may also be used. For example, 1,1-dihydroperfluoropropyl tosylate, 1,1-dihydroperfluorobutyl tosylate, 1,1-dihydroperfluoropentyl tosylate, 1,1-dihydroperfluorohexyl tosylate, 1,1-dihydroperfluoroheptyl tosylate, 1,1-dihydroperfluorododecyl tosylate, 1,1-dihydroperfluorooctadecyl tosylate, and the like, may each be reacted with the alkali metal sulfide to give the corresponding fluoroalkyl sulfide as set forth above.

As pointed out in U.S. 2,894,991, the disulfides and polysulfides made by the process of this invention are useful as intermediates for the preparation of the corresponding mercaptans. These mercaptans are made by simple reduction of the disulfides with hydrogen or other reducing agent. The monosulfides themselves are useful as nematocides, as clearly disclosed in Example 7 of the above patent. All of these sulfides may be used as odorants for fuel gas.

In addition to the above-described uses, the disulfides prepared by the process of this case are useful as intermediates to novel sulfonyl chlorides and sulfonic acids. By treating the sulfides with chlorine in aqueous systems, 1,1-dihydroperfluoroalkyl sulfonyl chlorides are readily obtained. The sulfonyl chlorides are, in turn, readily hydrolyzed to the sulfonic acids, which compounds are strong acids. These acids are useful as alkylation catalysts or in the form of their alkali metal salts as surfactants. The lower alkyl esters of these sulfonic acids are also useful surfactants in non-aqueous systems.

EXAMPLE 6

Trifluoroethanesulfonyl chloride

Chlorine gas was passed through a stirred mixture of bis(trifluoroethyl) disulfide (30 g.) in 75 ml. of water at 60°–70° C. for two hours, after which time chlorine was no longer absorbed. After standing, the layer heavier than water was separated and dried over anhydrous magnesium sulfate. Vacuum distillation gave 32.5 g. (70% yield) of the colorless liquid, trifluoroethanesulfonyl chloride; B.P. 65° C. (45 mm.); $n_D^{23}$ 1.3873.

Analysis.—Calcd. for $C_2H_2ClF_3O_2S$: C, 13.16; H, 1.11; Cl, 19.40; S, 17.57. Found: C, 13.40; H, 1.12; Cl, 20.02; S, 17.27.

EXAMPLE 7

Trifluoroethanesulfonic acid

Hydrolysis of 20 g. of trifluoroethanesulfonyl chloride by refluxing with 50 ml. of water for three hours gave a quantitative yield (18 g.) of trifluoroethanesulfonic acid after removal of the water under vacuum. Vacuum distillation of the acid gave the colorless, hygroscopic solid, $(CF_3CH_2SO_3H)$; B.P. 100° C. (0.5 mm.); M.P. 50–52° C.

Analysis.—Calcd. for $C_2H_3F_3O_3S$: Neutral equivalent, 164. Found: N.E., 165. Calcd.: C, 14.64; H, 1.84. Found: C, 14.46; H, 1.99.

It is surprising and entirely unpredictable that by using a di-lower alkyl sulfoxide as the liquid solvent for the reaction of alkaline metal sulfides with the 1,1-dihydroperfluoroalkyl tosylate two surprising effects are obtained, viz, (1) a significant increase in yield and (2) elimination of mercaptan formation. The increased yield is obviously desirable and results in a more economical and more efficient process for the preparation of these fluoroalkyl sulfides. The fact that no mercaptans are formed is also desirable in that purer sulfide products are obtained without the necessity for separation steps.

Many different embodiments may be made without departing from the scope and spirit of this invention and this invention includes such embodiments and is not limited by the above description.

I claim:

1. A process for the preparation of a compound of structure $R_fCH_2S$—$CH_2$—$R_f$ where $R_f$ is a perfluoroalkyl group containing from one to seventeen carbon atom which comprises reacting in dimethylsulfoxide a 1,1-dihydroperfluoroalkyl tosylate containing from one to eighteen carbon atoms in said dihydroperfluoroalkyl group with an alkali metal sulfide.

2. The process of claim 1 in which the alkali metal sulfide is sodium hydrosulfide.

3. The process of claim 1 in which the alkali metal sulfide is sodium sulfide.

4. A process for the preparation of a compound of structure $R_f$—$CH_2$—S—S—$CH_2$—$R_f$ where $R_f$ is a perfluoroalkyl group containing from one to seventeen carbon atoms, which comprises reacting in dimethylsulfoxide a 1,1-dihydroperfluoroalkyl tosylate containing from one to eighteen carbon atoms in said dihydroperfluoroalkyl group with an alkali metal disulfide.

5. The process of reacting in dimethylsulfoxide solvent, 1,1-dihydroperfluoroethyl tosylate with sodium hydrosulfide.

6. The process of reacting in dimethylsulfoxide solvent 1,1-dihydroperfluoroethyl tosylate with sodium sulfide.

7. A process for the preparation of a compound of structure $R_fCH_2S_xCH_2R_f$ where $R_f$ is a perfluoroalkyl group containing from one to seventeen carbon atoms and $x$ is a small integer which comprises reacting a 1,1-dihydroperfluoroalkyl tosylate containing from one to eighteen carbon atoms in said dihydroperfluoroalkyl group with an alkali metal sulfide, said reaction being conducted in a solvent consisting essentially of a liquid di-lower alkyl sulfoxide.

8. A process for the preparation of a compound of structure $CF_3CH_2$—$S_x$—$CH_2$—$CF_3$ where $x$ is a small integer which comprises reacting 1,1-dihydroperfluoroethyl tosylate with an alkali metal sulfide, said reaction being conducted in a solvent consisting essentially of a liquid di-lower alkyl sulfoxide.

9. A process for the preparation of $$CF_3-CH_2-S-CH_2-CF_3$$

which comprises reacting in dimethylsulfoxide 1,1-dihydroperfluoroethyl tosylate with an alkali metal sulfide.

10. A process for the preparation of $$CF_3-CH_2-S-S-CH_2-CF_3$$

which comprises reacting in dimethylsulfoxide 1,1-dihydroperfluoroethyl tosylate with an alkali metal disulfide.

References Cited in the file of this patent

UNITED STATES PATENTS 2,894,971    O'Rear et al.    July 14, 1959